(12) United States Patent
Turner et al.

(10) Patent No.: US 7,313,100 B1
(45) Date of Patent: Dec. 25, 2007

(54) NETWORK DEVICE HAVING ACCOUNTING SERVICE CARD

(75) Inventors: Stephen W Turner, Menlo Park, CA (US); Hsien-Chung Woo, Fremont, CA (US); Sanjay Kalra, San Jose, CA (US); Truman Joe, Mountain View, CA (US); Wendy R Cartee, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1034 days.

(21) Appl. No.: 10/228,150

(22) Filed: Aug. 26, 2002

(51) Int. Cl.
*H04L 12/26* (2006.01)

(52) U.S. Cl. .................. 370/253; 370/244; 370/252; 370/392

(58) Field of Classification Search .............. 370/235, 370/242–244, 250, 252, 253, 389, 392, 396, 370/469, 471; 709/223, 224, 229
See application file for complete search history.

(56) References Cited

U.S. PATENT DOCUMENTS

| | | | |
|---|---|---|---|
| 3,962,681 A | | 6/1976 | Requa et al. |
| 4,032,899 A | | 6/1977 | Jenny et al. |
| 4,600,319 A | | 7/1986 | Everett, Jr. |
| 5,408,539 A | | 4/1995 | Finlay et al. |
| 5,490,252 A | * | 2/1996 | Macera et al. ............ 709/249 |
| 5,509,123 A | | 4/1996 | Dobbins et al. |
| 5,568,471 A | * | 10/1996 | Hershey et al. ............ 370/245 |
| 6,011,795 A | | 1/2000 | Varghese et al. |
| 6,018,765 A | | 1/2000 | Durana et al. |
| 6,148,335 A | * | 11/2000 | Haggard et al. ............ 709/224 |
| 6,182,146 B1 | | 1/2001 | Graham-Cumming, Jr. |
| 6,321,338 B1 | * | 11/2001 | Porras et al. ............ 726/25 |

(Continued)

FOREIGN PATENT DOCUMENTS

| | | | |
|---|---|---|---|
| WO | WO 9836532 A1 | * | 8/1998 |
| WO | WO 2084920 A2 | * | 10/2002 |

OTHER PUBLICATIONS

Weaver, A.C. et al., "A Real-Time Monitor for Token Ring Networks," Military Communications Conference, 1989. MILCOM '89. Oct. 1989. vol. 3. pp. 794-798.*

(Continued)

*Primary Examiner*—Chi Pham
*Assistant Examiner*—Donald L Mills
(74) *Attorney, Agent, or Firm*—Shumaker & Sieffert P.A.

(57) ABSTRACT

A network device integrates accounting functionality for generation of flow statistics with packet intercept functionality to provide a comprehensive traffic analysis environment. The device comprises a set of network interface cards to receive packets from a network, and a set of accounting service cards to calculate flow statistics for the packets. The device further comprises a control unit to receive the network packets from the interface cards and distribute the packets to the set of accounting service cards. The accounting service card comprises an interface for insertion within a slot of a network device. Accounting service cards may be added to easily scale the network device to support higher bandwidth communication links, such as OC-3, OC-12, OC048 and higher rate links. Additional accounting service cards may be used for purposes of redundancy to support continuous, uninterrupted packet processing and accounting in the event of a card failure.

24 Claims, 9 Drawing Sheets

U.S. PATENT DOCUMENTS

| | | | |
|---|---|---|---|
| 6,392,996 B1 | 5/2002 | Hjalmtysson | |
| 6,499,088 B1 | 12/2002 | Wexler et al. | |
| 6,563,796 B1 * | 5/2003 | Saito | 370/252 |
| 6,590,898 B1 | 7/2003 | Uzun | |
| 6,594,268 B1 | 7/2003 | Aukia et al. | |
| 6,598,034 B1 | 7/2003 | Kloth | |
| 6,735,201 B1 | 5/2004 | Mahajan et al. | |
| 6,751,663 B1 | 6/2004 | Farrell et al. | |
| 6,826,713 B1 | 11/2004 | Beesley et al. | |
| 6,983,294 B2 * | 1/2006 | Jones et al. | 707/202 |
| 6,985,956 B2 * | 1/2006 | Luke et al. | 709/229 |
| 7,114,008 B2 | 9/2006 | Jungck et al. | |
| 2002/0141343 A1 | 10/2002 | Bays | |
| 2003/0005145 A1 | 1/2003 | Bullard | |
| 2003/0120769 A1 | 6/2003 | McCollom et al. | |
| 2003/0214913 A1 | 11/2003 | Kan et al. | |

OTHER PUBLICATIONS

Dini, P. et al., "Performance Evaluation for Distributed System Components," Proceedings of IEEE Second International Workshop on Systems Management. Jun. 1996. pp. 20-29.*

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

"The CAIDA Web Site," www.caida.org/, 2000.

"About Endace," www.endace.com/, 2000.

"Cisco IOS NetFlow," www.cisco.com/warp/public/732/Tech/nmp/netflow/index.shtml, 2002.

U.S. Appl. No. 10/188,567, entitled "Adaptive Network Flow Analysis", filed Jul. 2, 2002, Scott Mackie.

U.S. Appl. No. 10/228,132, entitled "Adaptive Network Router", filed Aug. 26, 2002, Woo et al.

U.S. Appl. No. 10/228,114, entitled "Network Router Having Integrated Flow Accounting and Packet Interception", filed Aug. 26, 2002, Woo et al.

U.S. Appl. No. 10/241,785, entitled "Rate-Controlled Transmission of Traffic Flow Information", filed Sep. 10, 2002, Sandeep Jain.

* cited by examiner

NETWORK DEVICE HAVING ACCOUNTING SERVICE CARD

TECHNICAL FIELD

The invention relates to computer networks and, more particularly, to techniques for analyzing traffic flow within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Internet Protocol (IP).

A system administrator or other user often makes use of a network analyzer to monitor network traffic and debug network problems. In general, a network analyzer is a tool that captures data from a network and presents the data to the user. The network analyzer typically allows the user to browse the captured data, and view summary and detail information for each packet. Accordingly, the user can view the network traffic flowing between devices on the network. The information collected during traffic flow analysis may be used for network planning, traffic engineering, network monitoring, usage-based billing and the like. Many conventional network analyzers, such as NetFlow, NeTraMet and FlowScan, use software applications to collect traffic flow information.

The analyzers typically monitor and collect packets having routing information that matches criteria specified by the system administrator. The system administrator may specify, for example, source and destination Internet Protocol (IP) addresses, source and destination port numbers, protocol type, type of service (ToS) and input interface information. The analyzers typically collect packets matching the specified criteria, and construct flow analysis diagrams. Conventional network analyzers often make use of sampling techniques to selectively sample the packets, and present a statistically generated view of the traffic within the network. Consequently, the statistics generated by the network analyzer may not only be limited to specified flows, but may be relatively inaccurate.

SUMMARY

In general, the invention is directed to techniques for monitoring and analyzing traffic flows within a network. A network monitor, in accordance with the principles of the invention, integrates accounting functionality for generation of flow statistics with packet intercept funtionality to provide a comprehensive traffic analysis environment.

In one embodiment, an apparatus comprises a set of interface cards to receive packets from a network, and a set of accounting service cards to calculate flow statistics for the packets. The apparatus further comprises a control unit to receive the packets from the interface cards and distribute the packets to the set of accounting service cards.

In one embodiment, an accounting service card comprises an interface for insertion within a slot of a network device, and an accounting unit to receive packets from the network device via the interface. The accounting unit calculates flow statistics based on the network packets.

In another embodiment, a method comprises receiving packets from a network via an interface card of a network device, and distributing the packets to a set of accounting service cards of the network device. The method further comprises calculating with the accounting service cards flow statistics for the packets.

In another embodiment, a method for computing flow statistics within an accounting service card of a network device comprises receiving packets from a control unit of a network router via an interface, and calculating flow statistics for the packets. The method further comprises outputting a packet stream carrying the flow statistics and the received packets to the control unit for routing in accordance with routing information for the network.

The techniques may provide one or more advantages. For example, according to the principles of the invention, multiple accounting service cards may be added to easily scale the network monitor to support monitoring and accounting for higher bandwidth communication links. Depending upon processing power, two accounting service cards may be used to provide accounting for a single OC-3 communication link, while four cards and sixteen cards may be used to monitor OC-12 and OC-48 links, respectively. As another example, eight accounting service cards may be used to monitor four OC-3 links. Additional accounting service cards may be used for purposes of redundancy to support continuous, uninterrupted packet processing and accounting in the event of card failure.

Consequently, the flow analysis and packet intercept features may be readily integrated within a router for a packet-based network. The router may, for example, operate as a core router within the Internet to route packets received from high data rate communication links, such as OC-3, OC-12, OC-48, and greater communication links. The router may integrate accounting functionality to generate flow records for routed packets, as well as intercept features to capture packets for select packet flows. In this manner, the router can adjust routing functions based on the generated flow records and intercepted packets, thereby dynamically reacting to network events, such as Denial of Service (DOS) attacks and other network security violations.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
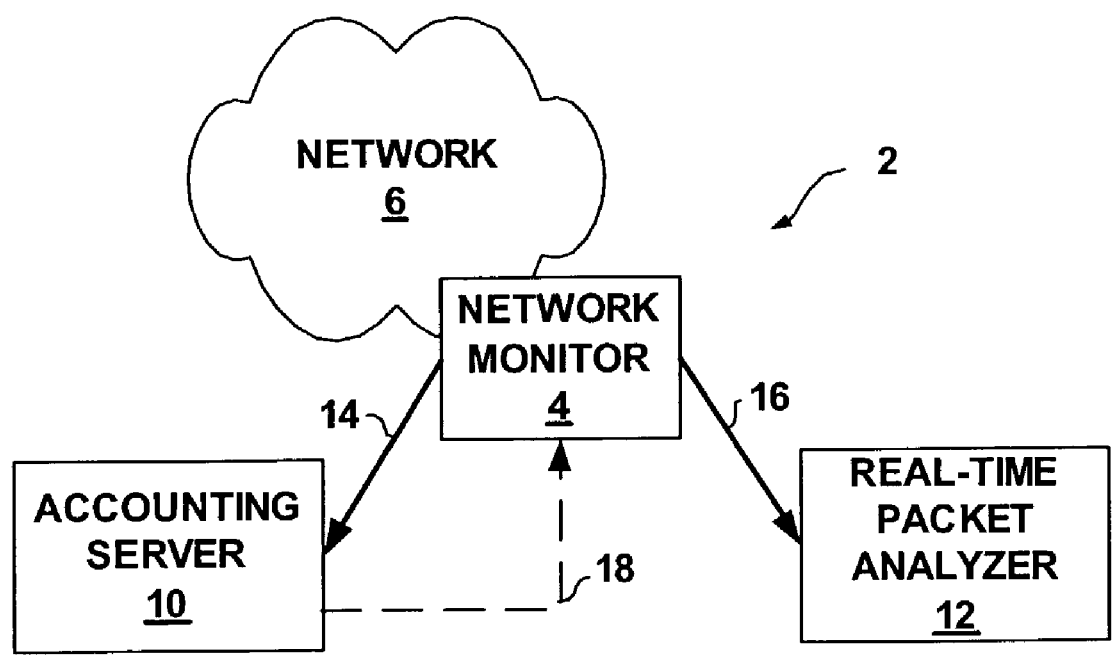
FIG. 1 illustrates an exemplary system in which a network monitor integrates accounting functionality for generation of flow records along with packet intercept functionality to provide a comprehensive traffic analysis environment in accordance with the principles of the invention.

FIG. 1 illustrates an exemplary system 2 in which a network monitor 4 integrates accounting functionality for generation of flow records with packet intercept functionality to provide a comprehensive traffic analysis environment in accordance with the principles of the invention. Network monitor 4 is coupled to network 6 for monitoring network traffic. Network 6 may be formed by an interconnected group of autonomous systems, each representing an independent administrative domain having a variety of networked resources capable of packet-based communication. For example, network 6 may include servers, workstations, network printers and fax machines, gateways, routers, and the like. Each autonomous system within network 6 typically includes at least one router for sharing routing information with, and forwarding packets to, the other autonomous systems via communication links.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

As described, network monitor 4 includes one or more accounting modules that generate accurate flow statistics for traffic within network 6. More specifically, network monitor 4 captures packets from one or more links within network 6, and can generate flow statistics for each packet flow within the link. As network monitor 4 receives packets, the accounting modules associate the network packets with respective packet flows, and update the statistics for the packets flows. For example, the accounting modules may maintain an accurate packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, and the like, for each packet flow.

The accounting modules provide real-time accounting capabilities for maintaining accurate flow statistics for all of the packets received by network monitor 4. In particular, as described herein, the accounting modules can monitor and generate statistics for high traffic rates, even core traffic rates of the Internet, including OC-3, OC-12, OC-48, and higher rates.

Network monitor 4 outputs a stream of flow records 14 that carry flow statistics for the captured packets. Network monitor 4 may, for example, output flow records 14 carrying accounting data for each flow, such as a number of packets, a number of bytes, a time of capturing a first packet for the flow, a time of capturing a most recent packet for the flow, an incoming interface, an outgoing interface, a source/destination network mask, a source/destination Autonomous System (AS) number, and the like. Accounting server 10 receives flow records 14, and updates an accounting system based on the flow records for further detailed analysis.

In addition, network monitor 4 provides intercept capabilities that allow a real-time packet analyzer 12 to monitor specific packet flows within network 4. Network monitor 4 outputs a stream of packets 16 to real-time packet analyzer 12 for further analysis. The stream of packets 16 comprises a subset of the packets captured from network 6. In particular, network monitor 4 intercepts packets for one or more selected packet flows within network 4, and outputs the intercepted packets as a stream of packets 16. Packet analyzer 12 receives the stream of packets 16, and analyzes the packets to identify any suspicious packet flows. For example, packet analyzer 12 may identify packet flows arising from Denial of Service (DOS) attacks and other network security violations.

A system administrator may provide intercept information to network monitor 4 that specifies a set of packet flows for which to capture packets. The system administrator may provide the intercept information directly, e.g., via a keyboard, mouse or other input mechanism, to control interception of packet flows. In addition, an administrator may remotely provide the routing information to network monitor 4 via a remote management protocol. In this manner, the administrator may selectively define the packet flows, and packets within a given flow, that are intercepted for analysis.

Network monitor 4 may also control the stream of intercepted packets 16 based on feedback from accounting server 10. More specifically, accounting server 10 may perform preliminary traffic analysis based on the flow records 14 received from network monitor 4, and provides filter information 18 to the network monitor to control the interception and forwarding of packets flows to packet analyzer 12 for further analysis. In this manner, network monitor 4 integrates accounting functionality for generation of flow records 14 along with packet intercept functionality to provide a comprehensive traffic analysis environment.

Although illustrated as a stand-alone apparatus, the features of network monitor 4 may be integrated within a network device. For example, as described in detail below, the feature may be integrated within a router. Other network devices in which the features may be integrated include gateways, switches, servers, workstations, and the like.

Figure 2:
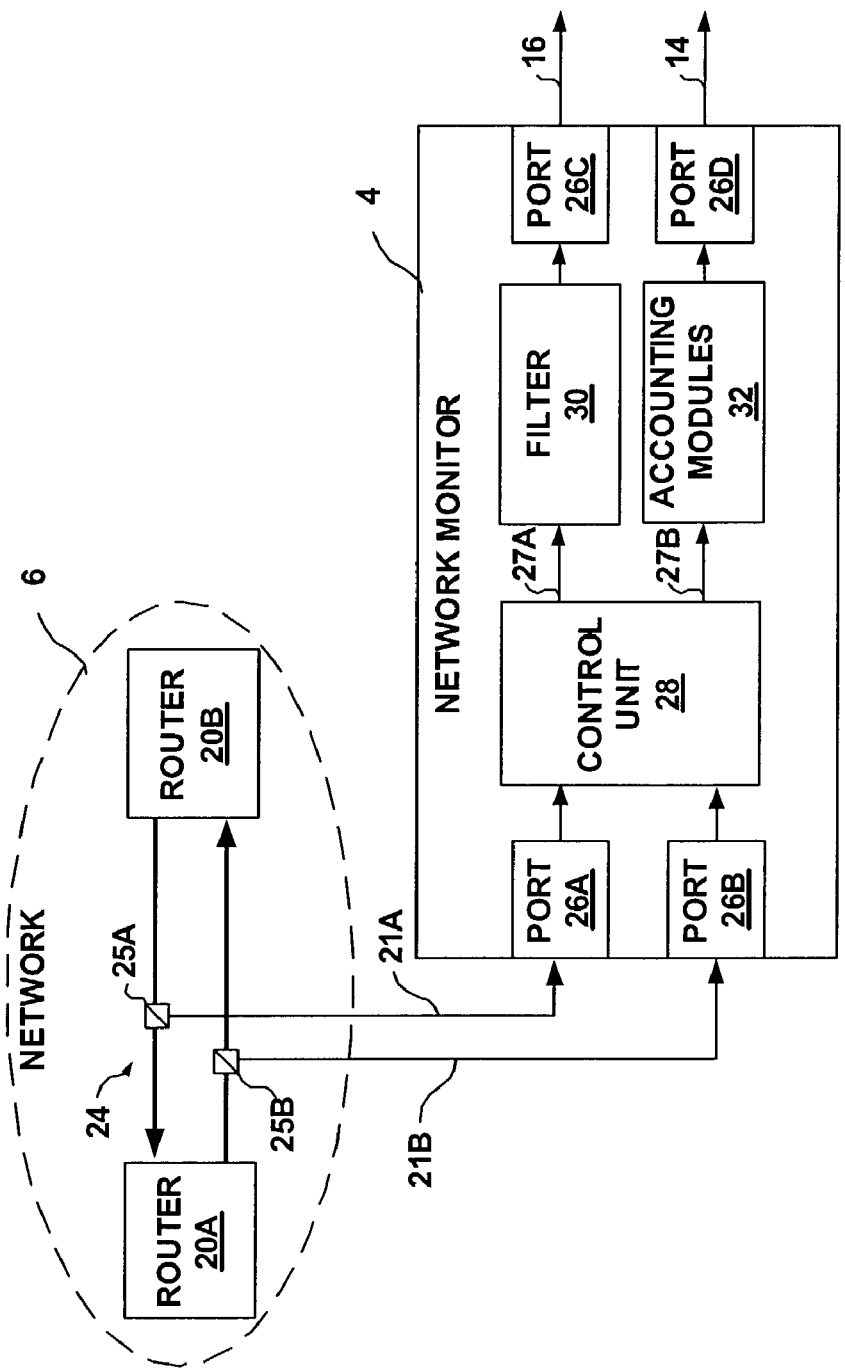
FIG. 2 is a block diagram illustrating an example embodiment of a network monitor consistent with the principles of the invention.

FIG. 2 is a block diagram illustrating in further detail an example embodiment of network monitor 4 coupled to communication links 24 of network 6. As illustrated, network 6 includes routers 20A, 20B ("routers 20") coupled via communication links 24. Routers 20 may comprise conventional routers that forward packets in accordance with a topology of network 6. Communication links 24 may comprise uni-directional optical links for carrying packets between routers 20 at high data rates, such as OC-3, OC12, OC-48 and greater rates. Optical splitters 25A, 25B ("optical splitters 25") may be inserted within communication links 24 to passively collect optical data transmitted and received between routers 20.

Network monitor 4 includes two ports 26A, 26B for receiving the optical data 21A, 21B, respectively, and forwarding the data in digital form to control unit 28. As discussed in detail, control unit 28 merges the inbound data 21A, 21B received from ports 26A, 26B, and digitally generates two identical packets streams 27A, 27B from the data. Control unit 28 applies filter 30 to packet stream 27A to selectively capture packet flows 16 for forwarding to packet analyzer 12 via output port 26C. In addition, control unit 28 distributes packets of the second stream 27B to accounting modules 32. Accounting modules 32 generate flow records 14 based on all of the packets of data stream 27B, i.e., all of the packets received form optical splitters 25, and forward flow records 14 to accounting server 10 via output port 26D.

Accounting modules 32 may buffer flow records 14 for a given packet flow until the flow "expires," i.e., when the accounting modules 32 detect inactivity for the flow for a configurable period of time, e.g., 30 minutes. Accounting modules 32 may periodically output batches of flow records 14 for all flows that have recently expired, e.g., every fifteen, thirty or sixty seconds. For packet flows that remain active for long durations, accounting modules 32 may be configured to automatically expire the packet flows after a defined duration, e.g., 30 or 60 minutes. Upon marking the active packet flow as expired, accounting modules 32 may output one or more flow records 14 for the packet flow, and may reset the statistics for the packet flow. Alternatively, accounting modules may output flow records 114 without resetting the statistics for the active packet flow.

Figure 3:
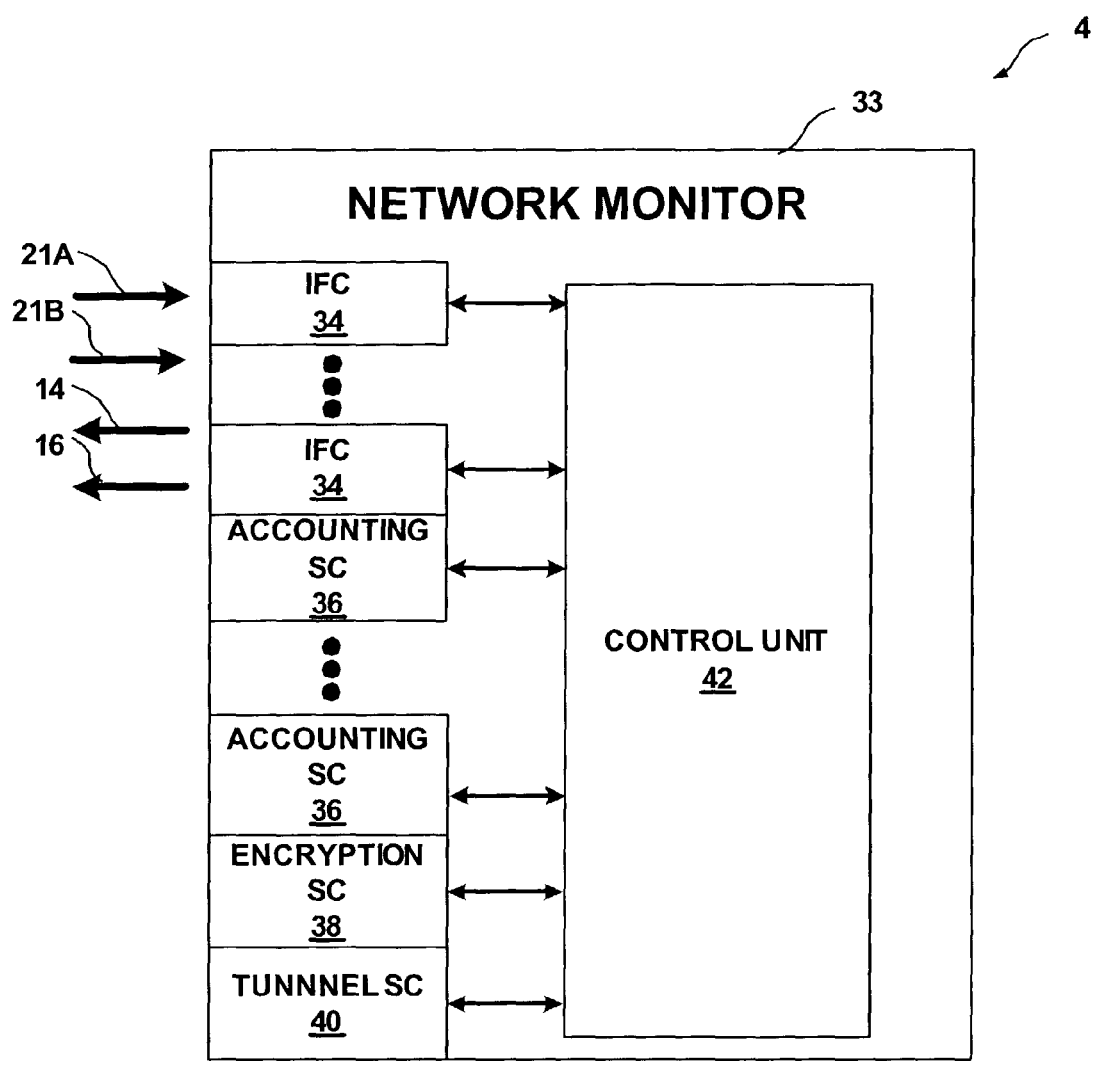
FIG. 3 is a block diagram illustrating another exemplary embodiment of a network monitor in further detail.

FIG. 3 is a block diagram illustrating another exemplary embodiment of a network monitor 4. In the illustrated embodiment, network monitor 4 includes a chassis 33 for housing control unit 42. Chassis 33 has a number of slots (not shown) for receiving a set of cards, including interface cards (IFCs) 34, accounting service cards (ACCOUNTING SCs) 36, an encryption service card (ENCRYPTION SC) 38, and a tunnel service card (TUNNEL SC) 40. Each card may be inserted into a corresponding slot of chassis 33 for electrically coupling the card to control unit 42 via a bus, backplane, or other electrical communication mechanism.

Interface cards 34 include ports for receiving inbound data 21 from optical splitters 25, and for outputting flow records 14 and intercepted packet flows 16. Accordingly, interface cards 34 include a number of ports (not shown) for coupling with communication links.

Accounting service cards 36 each include one or more accounting modules that generate flow records based on packets received from control unit 42. Each accounting service card 36 may, for example, include one or more microprocessors, FPGAs, ASICs, or other components. As described, control unit 42 distributes packets to accounting service cards 36 for accounting and generation of flow records 14. In one embodiment, control unit 42 distributes the packets of a common flow to a common accounting service card 36. In other words, control unit 42 distributes packet flows across accounting service cards 36, and ensures that packets of any particular flow are distributed to a common one of accounting service cards 36. In this manner, each of accounting service cards can generate complete flow records for the packet flows for which the card receives packets.

In one embodiment, control unit 42 applies a hashing function to at least a portion of the header for each packet to ensure that packet flows are distributed across accounting service cards 36, and that packets of a packet flow are distributed to a common one of the accounting service cards 36. Control unit 42 may apply a hashing function to at least one of a source network address, a destination network address, and a communication protocol for the packet. Control unit 42 may apply the hash function to header information with each packet to generate a hash value, and distribute each packet to one of the accounting service cards 36 based on the calculated hash values. Furthermore, portions of the header information may be selected to cause packet fragments associated with a common one of the network packet to be distributed to a common one of the accounting service cards. For example, layer 4 port information may be ignored, which may not be present for packet fragments.

Multiple accounting service cards 36 may be added to easily scale network monitor 4 to support monitoring and accounting for higher bandwidth communication links. For example, depending upon processing power, two accounting service cards 36 may be used to provide accounting for a single OC-3 communication link, while four cards and sixteen cards may be used to monitor OC-12 and OC-48 links, respectively. As another example, eight accounting service cards 36 may be used to monitor four OC-3 links. Additional accounting service cards 36 may be used for purposes of redundancy to support continuous, uninterrupted packet processing and accounting in the event of card failure.

As described with respect to accounting modules 32 (FIG. 2), accounting service cards 36 may output the flow records 14 for a given packet flow when the flow "expires," i.e., when the accounting service cards 36 detect inactivity for the flows for a configurable period. For example, accounting service cards 36 may make use of inactivity timers to determine when to output flow records. For packet flows that remain active for long durations, accounting service cards 36 may be configured to automatically expire the packet flows after a defined duration, e.g., 30 or 60 minutes.

If accounting server 10 and packet analyzer 12 are co-located with network monitor 4, control unit 42 may direct the flow records and intercepted packets directly to an appropriate output port of interface cards 34. In environments where accounting server 10 and packet analyzer 12 are located at remote destinations from network monitor 4, control unit 42 may make use of encryption service card 38 and tunnel service card 40 to preserve security.

Encryption service card 38 provides cryptographic functionality to network monitor 4. In particular, control unit 42 may forward flow records generated by accounting service cards 36 to encryption service card 38 prior to forwarding to accounting server 10. In addition, control unit 42 may forward the intercepted packets for the select packet flows to encryption service card 38 for encryption prior to forwarding to packet analyzer 12.

Network monitor 4 may also include a network tunneling mechanism for relaying the flow records and intercepted packets through tunnels. Encryption service card 38 may provide IPSec tunnel, while tunnel service card 40 may provide GRE and IPIP tunnels. Tunnel service card 40 aggregates traffic received from interface cards 34, and returns the traffic back to control unit 42 for output via interface cards 34. Control unit 42 may apply filter-based forwarding (FBF) to direct the returned traffic to the appropriate output port of IFCs 34.

Figure 4:
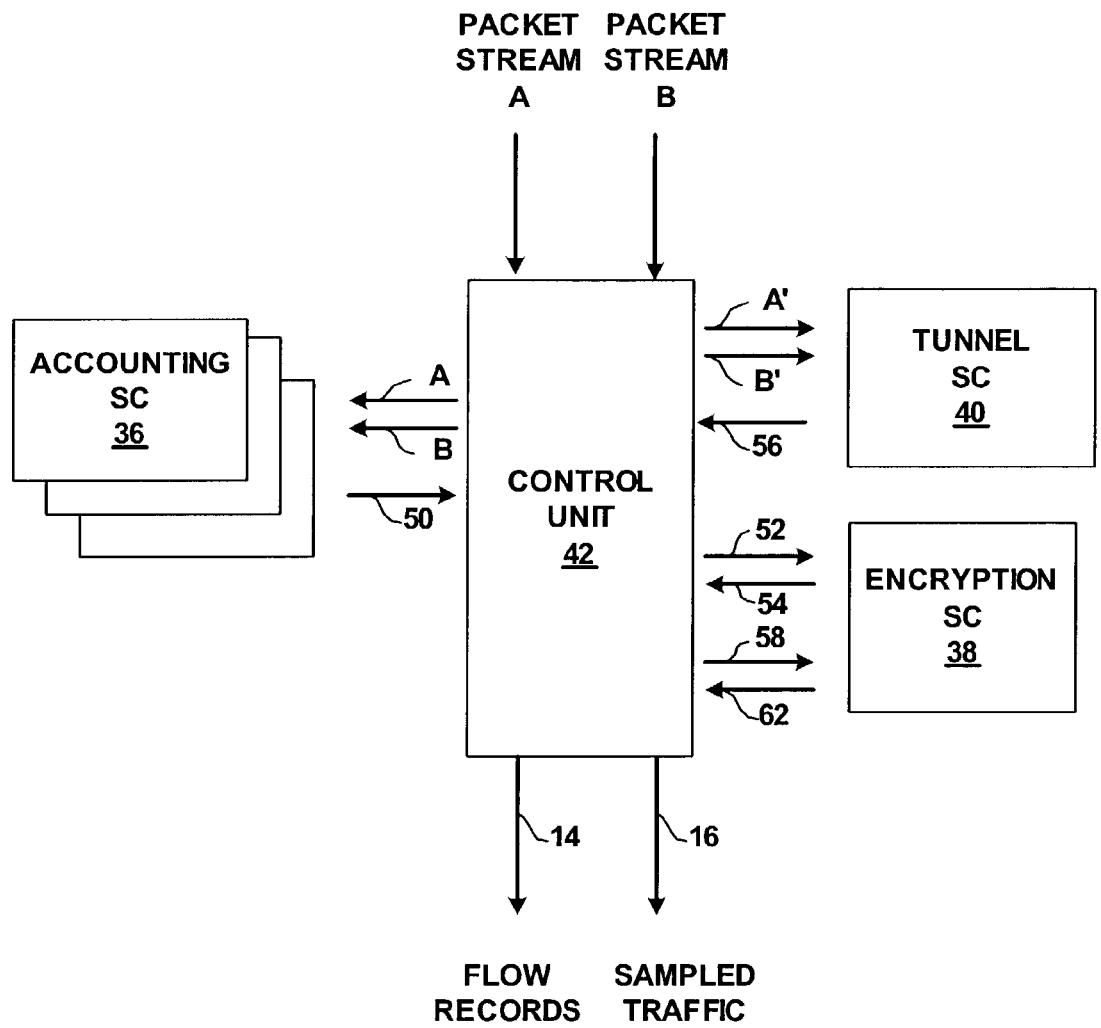
FIG. 4 is a block diagram illustrating the flow of packets through the various components of a network monitor in accordance with the principles of the invention.

FIG. 4 is a block diagram illustrating the flow of packets through the various components of a network monitor 50 in accordance with the principles of the invention. In the illustrated example, network monitor 50 monitors multiple communication links. In particular, network monitor 50 collects transmit and receive packets for a first communication link (labeled packet stream A in FIG. 1), and a second communication link (packet stream B). The first communication link may, for example, comprise an OC-12 link, and the second communication link may comprise an OC-48 link.

Initially, control unit 42 receives packets streams A, B via separate monitoring ports (not shown). As described above, optical splitters may be used to passively collect packet streams A, B from the respective communication links. Control unit 42 distributes packet stream A, B to accounting service cards 36 for generation of a stream of packets 50 carrying flow records. More specifically, accounting service cards 36 collect information from the packet flows within packet streams A, B and, based on the information, output packets 50 carrying flow records to control unit 42.

If encryption is enabled, control unit 42 forwards packet stream 50 as packet stream 52 to carry the flow records to encryption card 38 for encryption. Encryption card 38 encrypts each incoming packet 52, and returns a stream of encrypted packets 54 to control unit 42. Control unit 42 forwards the encrypted packets carrying flow records 14 to accounting server 10 via an output port of one or more of interface cards 34.

Simultaneous with the above-described accounting process, control unit 42 mirrors and filters each of the incoming packets of incoming packet streams A, B to produce packet streams A', B'. Control unit 42 may, for example, buffer incoming packets for packet streams A, B, and digitally copy each buffered packet to internally mirror packets streams A, B. Control unit 42 applies a filtering operation to the mirrored packet streams to produce packet streams A', B' having intercepted packets for select packet flows. Consequently, packet streams A', B' carry copies of a subset of the packets within incoming packet streams A, B, respectively.

Control unit 42 forwards packet streams A', B' to tunnel service card 40 for aggregation and loopback to control unit 42 as aggregated packet stream 56. Finally, control unit 42 applies filter-based forwarding (FBF) to forward aggregated packet stream 56 to packet analyzer 12 as output packet stream 16. More specifically, control unit 42 directs aggregated packet stream 56 to an appropriate output interface card as packet stream 16 for forwarding to packet analyzer 12. If encryption is enabled, control unit may forward aggregated packet stream 56 to encryption service card 38 as packet stream 58, and may receive encrypted packet stream 62 in return for forwarding to packet analyzer 12 as packet stream 16.

Figure 5:
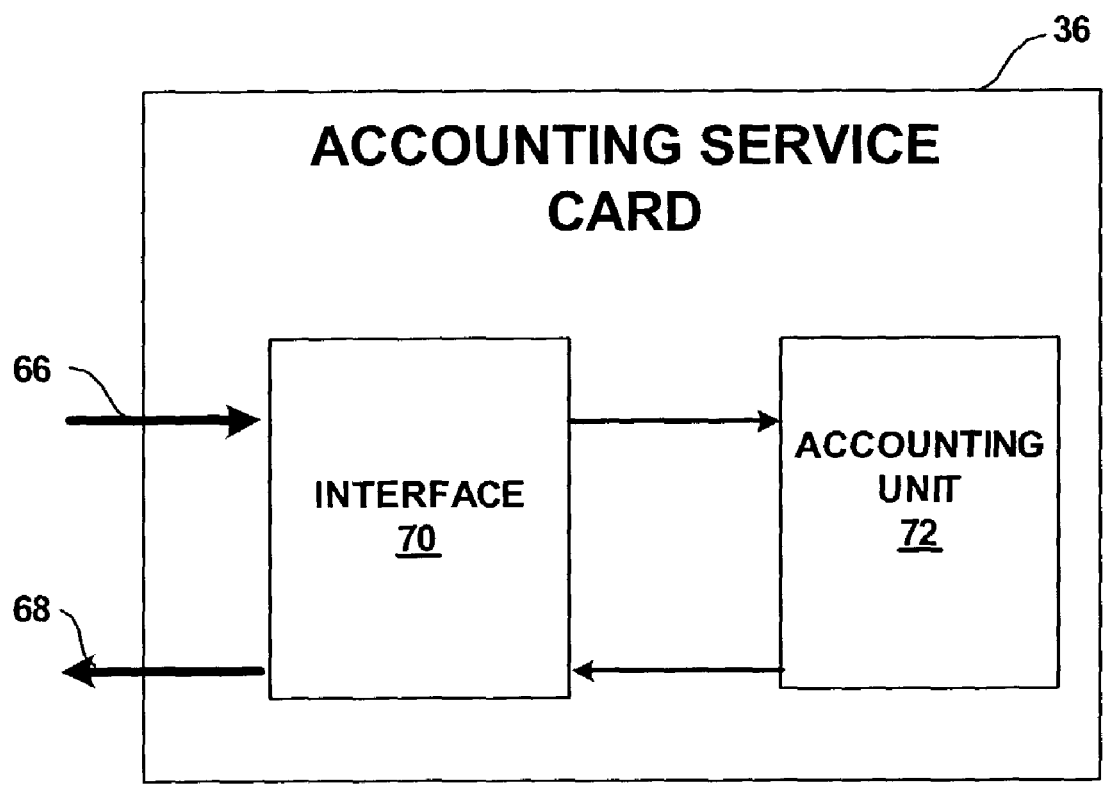
FIG. 5 is a block diagram illustrating an example embodiment of an accounting service card in accordance with the principles of the invention.

FIG. 5 is a block diagram illustrating an example embodiment of an accounting service card 36 in accordance with the principles of the invention. Accounting service card 36 receives inbound packet stream 66 via interface 70. Interface 70 may, for example, comprise a high-speed communication bus, back plane, switch fabric, or the like, to allow accounting service card 36 to easily be inserted and removed from an interface slot within the chassis of network monitor 33. In this fashion, interface 70 allows multiple accounting service cards 36 to be added to network monitor chassis 33 to support monitoring of high data rate communication links.

Interface 70 forwards packet stream 66 to accounting unit 72 for updating flow statistics. Interface 70 may forward each packet in its entirety, or may extract only those portions of the packets necessary for maintaining accurate flow statistics. Interface 70 may, for example, extract header information and forward the extracted header information to accounting unit 72. In this manner, bandwidth efficiencies may be achieved between interface 70 and accounting unit 72. The extracted header information may include information necessary for determining a particular packet flow for each packet, such as a source network address, a destination network address, a protocol, a source port number, and a destination port number, as well as information for generating flow statistics, such as a byte count for each packet.

Based on the received packets, accounting unit 72 updates flow statistics, and output packets 68 carrying flow records. Accounting unit 72 may comprise one or more microprocessors, FPGAs, ASICs, combinations thereof, and the like. As described above, accounting service cards 36 may output the flow records for a given packet flow when the flow "expires," i.e., when the accounting service cards 36 detect inactivity for the flows for a configurable period. For example, accounting service cards 36 may make use of inactivity timers to determine when to output flow records. For packet flows that remain active for long durations, accounting service cards 36 may be configured to automatically expire the packet flows after a defined duration, e.g., 30 or 60 minutes. Interface 70 forwards packets 68 carrying flow records to control unit 42.

Figure 6:
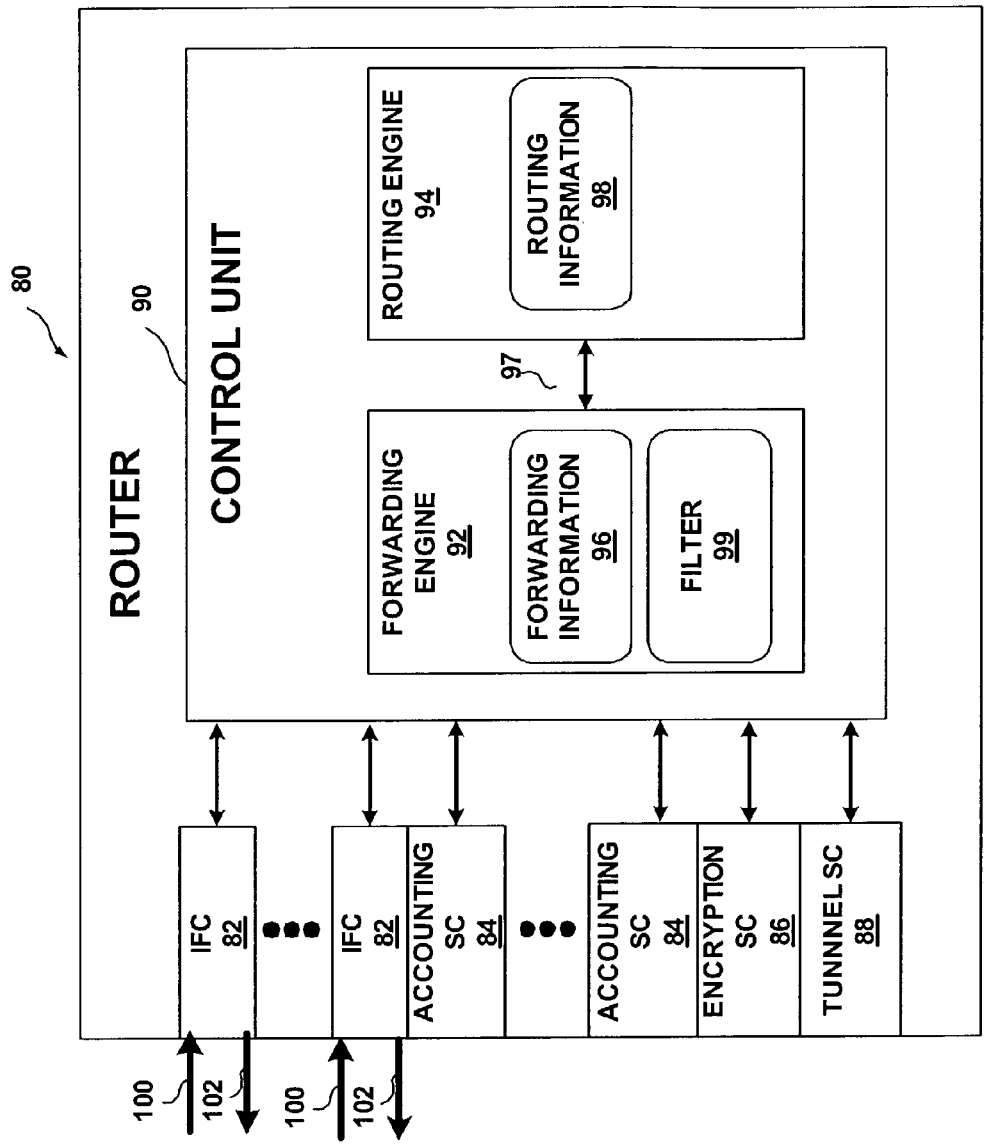
FIG. 6 is a block diagram illustrating an example embodiment of a router that incorporates accounting and intercept functionality.

FIG. 6 is a block diagram illustrating an example embodiment of a router 80 that incorporates accounting and intercept functionality consistent with the principles of the invention. Router 80 implements routing functionality to operate as a router within a packet-based network. Router 80 may, for example, operate as a core router within the Internet to route packets received from high data rate communication links, such as OC-3, OC-12, OC-48, and greater communication links. In addition, router 80 integrates accounting functionality to generate flow records for routed packets. Furthermore, router 80 integrates intercept features to capture packets for select packet flows. As described, router 80 can adjust routing functions based on the generated flow records and intercepted packets, thereby dynamically react to network events, such as Denial of Service (DOS) attacks and other network security violations.

Router 80 includes a control unit 90 that directs inbound packets received from inbound links 100 to appropriate outbound links 102. In particular, the functionality of control unit 90 can be divided between a routing engine 94 and a packet-forwarding engine 92.

Routing engine 94 is primarily responsible for maintaining routing information 98 to reflect the current network topology. In order to maintain an accurate representation of the network, router 80 supports a number of protocols for exchanging routing information with other routers. For example, router 80 may support the Border Gateway Protocol (BGP), for exchanging routing information with routers of other autonomous systems. Similarly, router 80 may support the Intermediate System to Intermediate System protocol (IS-IS), which is an interior gateway routing protocol for communicating link-state information within an autonomous system. Other examples of interior routing protocols include the Open Shortest Path First (OSPF), and the Routing Information Protocol (RIP).

Routing engine 94 directs packet-forwarding engine 92 to maintain forwarding information 96 in accordance with routing information 98. Forwarding information 96 may, therefore, be thought of as a subset of the information contained within routing information 98. In particular, forwarding information 96 associates packet information, referred to as a "key," with specific forwarding next hops (FNH). A FNH generally refers to a neighboring router physically coupled to a source router along a given route. For example, the FNH for a route may specify a physical interface and media access control (MAC) address for the interface associated with the router.

Packet-forwarding engine 92 controls the flow of packets through router 80 as described above in order to integrate routing, accounting and intercept functionality. For example, packet-forwarding engine 92 distributes inbound packets to accounting service cards 84 for accounting and generation of flow records. In addition, packet-forwarding engine 92 mirrors inbound packets, and applies filter 99 to the mirrored packet stream to intercept select packet flows.

Similar to the packet flow described above in reference to FIG. 4, encryption service card 86 provides cryptographic functionality and, along with tunnel service card 88, may provide a network tunneling mechanism for relaying the flow records and intercepted packets through secure tunnels.

To support routing functionality, accounting service cards 84 output packetized flow records to packet forwarding engine 92, and also returns the original packets. Packet forwarding engine 92 forwards the packets out interface cards 82 in accordance with forwarding information 96.

In one embodiment, each of packet-forwarding engine 92 and routing engine 94 may comprise one or more dedicated processors, hardware, and the like, and may be communicatively coupled by data communication channel 36. Data communication channel 36 may be a high-speed network connection, bus, shared-memory or other data communication mechanism.

Figure 7:
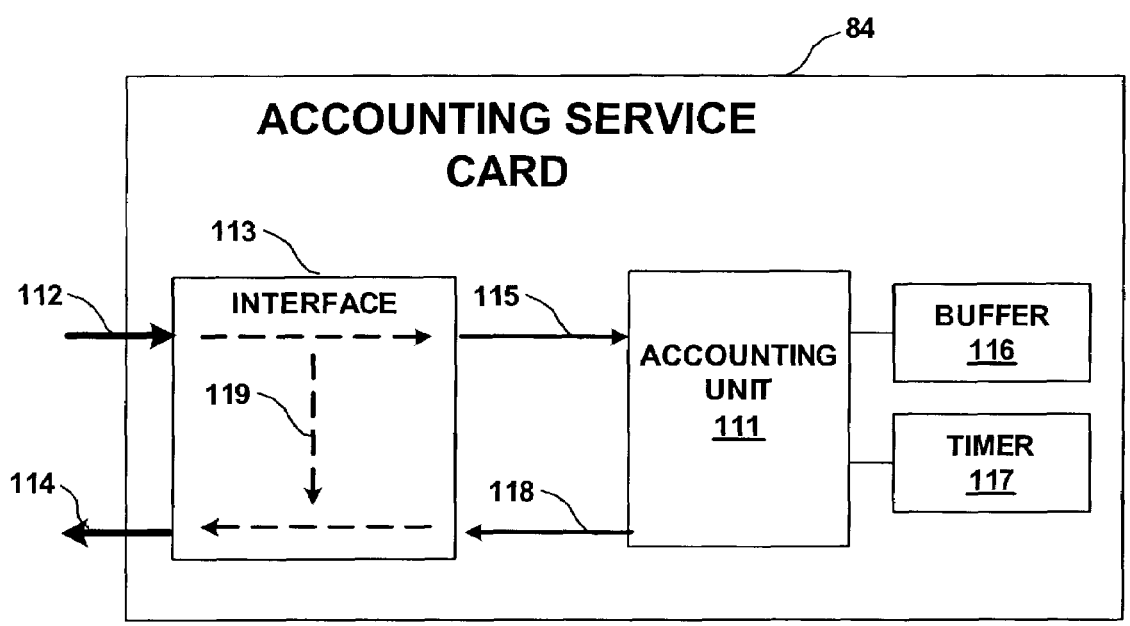
FIG. 7 is a block diagram illustrating another embodiment of an accounting service card.

FIG. 7 is a block diagram illustrating another embodiment of an accounting service card 84 in accordance with the principles of the invention. Accounting service card 84 receives inbound packet stream 112 via interface 113, which may comprise a high-speed communication bus, back plane, switch fabric, or the like. Interface 113 allows accounting service card 84 to easily be inserted and removed from an interface slot within the chassis of router 80. In this fashion, interface 112 allows multiple accounting service cards 84 to be added to router 80 to support monitoring of high data rate communication links.

Interface 113 extracts header information from packets 112, and forwards the extracted header information 115 to accounting unit 111 for computation of flow records 118. In addition, interface 113 redirects packets 112 to be returned to packet-forwarding engine 92 via loop-back path 119.

Based on the received header information 115, accounting unit 111 updates flow statistics, and output packets 1188 carrying flow records. Accounting unit 72 may comprise one or more microprocessors, FPGAs, ASICs, combinations thereof, and the like. Accounting unit 111 may store the flow records within buffer 116, and may output the flow records periodically in accordance with a configurable period, such as fifteen, thirty or sixty seconds, maintained by timer 117. Alternatively, accounting unit 111 may buffer the flow records until flow expire. In this configuration, accounting unit 111 allocates a corresponding timer 117 for each detected packet flow, and utilizes the timers to time periods of inactivity for each packet flow. Accounting unit 111 outputs flow records for a given packet flow upon detecting inactivity for the flow for a configurable period.

Interface 113 receives packets 118 carrying flow records, and merges packets 118 with packets 112 to form packet stream 114. Interface 113 directs packet stream 114 to packet-forwarding engine 92. In this fashion, accounting service card 80 outputs flow records 118 for a received packet stream 112, and also returns the packet stream to control unit 90 for routing. Upon receiving the returned packet stream, packet-forwarding engine 92 forwards the packets in accordance with forwarding information 96. More specifically, packet-forwarding engine 92 forwards the packets to interface cards 82 for output on communication links 102. In this manner, router 80 can function as a fully functional core routing device having integrated traffic analysis and intercept features.

Figure 8:
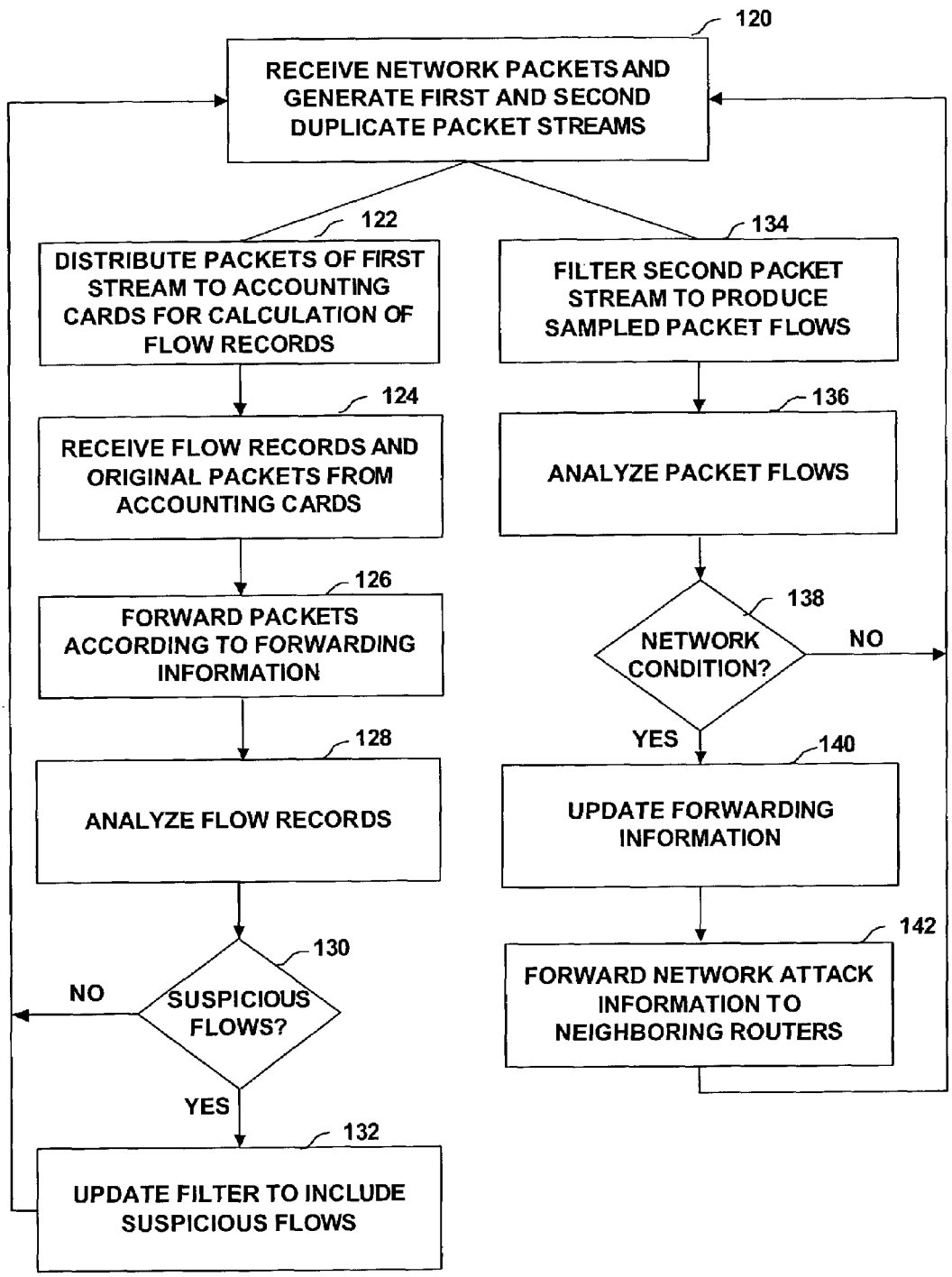
FIG. 8 is a flowchart illustrating operation of router that integrates traffic analysis and intercept features with routing functionality to dynamically react to network events, such as Denial of Service (DOS) attacks and other network security violations.

FIG. 8 is a flowchart illustrating operation of router 80 that integrates traffic analysis and intercept features with routing functionality to dynamically react to network events, such as Denial of Service (DOS) attacks and other network security violations.

Packet-forwarding engine 92 receives packet via inbound communication links 100, and mirrors each packet to produce duplicate packet streams (120). Next, packet-forwarding engine 92 distributes the packets of one stream to accounting service cards 84 for generation of flow records (122).

Packet-forwarding engine 92 receives the flow records from accounting service cards 84, as well as the original packets (124). Next, packet-forwarding engine 92 forwards the packets in accordance with forwarding information 96 (126).

In addition, control unit 90 analyzes the flow records received from accounting service cards 84 to identify any suspicious packet flows (128). For example, control unit may determine whether any packet flows have significant traffic levels that may indicate the presence of a Denial of Service attack or other network security violation. If control unit 90 identifies any suspicious flows (130), the control unit 90 modifies intercept filter 99 to enable real-time packet interception and traffic analysis for the suspicious flow (132).

Simultaneously with the above-described accounting process, control unit 90 applies filter 99 to the second of the mirrored packet streams to produce an intercepted set of packets for select packet flows (134). Control unit 90 analyzes the packet flows in real-time to determine whether a network condition exists, such as a network security violation (136). Although the analysis features have been described in reference to control unit 14, the features may readily be incorporated into one or more separate modules. For example, router 80 may comprise one or more packet analysis service cards to perform real-time analysis on the intercepted packets. Alternatively, or in addition, the real-time analysis functionality may be integrated within accounting service cards 84.

If a network condition exists that requires a response (138), control unit 90 updates forwarding information 96 (140). For example, routing engine 94 may regenerate forwarding information 96 from routing information 98 to adaptively terminate forwarding of one or more malicious packet flows. In other words, control unit 90 may dynamically update routing of packets based on flow records and real-time analysis of intercepted traffic. In this manner, router 80 integrates traffic analysis and intercept features with routing functionality to dynamically reacting to network events.

Control unit 90 may forward network condition information to other network devices, e.g., to warn the other network devices of a network attack (142). Control unit 90 may, for example, forward specific flow information regarding terminated packet flows. Control unit 14 may forward the information in accordance with routing protocols, such as BGP, IS-IS, RIP, and the like. These messages may, for example, advertise or withdraw routes or carry other network information, such as link state information.

For exemplary purposes, the integrated traffic analysis and intercept features of router 80 have been described with reference to accounting service cards 84, and, in particular, to the use of flow records that describe packet flow statistics. The techniques, however, may readily be applied to traffic analysis generally, and need not be based on packet flow statistics. In particular, router 80 may perform detailed analysis of traffic patterns and packet content, and may dynamically update forwarding information based on the analysis in response to the analysis. For example, accounting service cards 84 or dedicated traffic analysis cards may scan each packet received from packet-forwarding engine 92 to detect and filter any packets carrying a virus signature. Accounting service cards 84 may output to control unit 90 traffic analysis messages generally, possibly including packet flow records carrying flow statistics.

Figure 9:
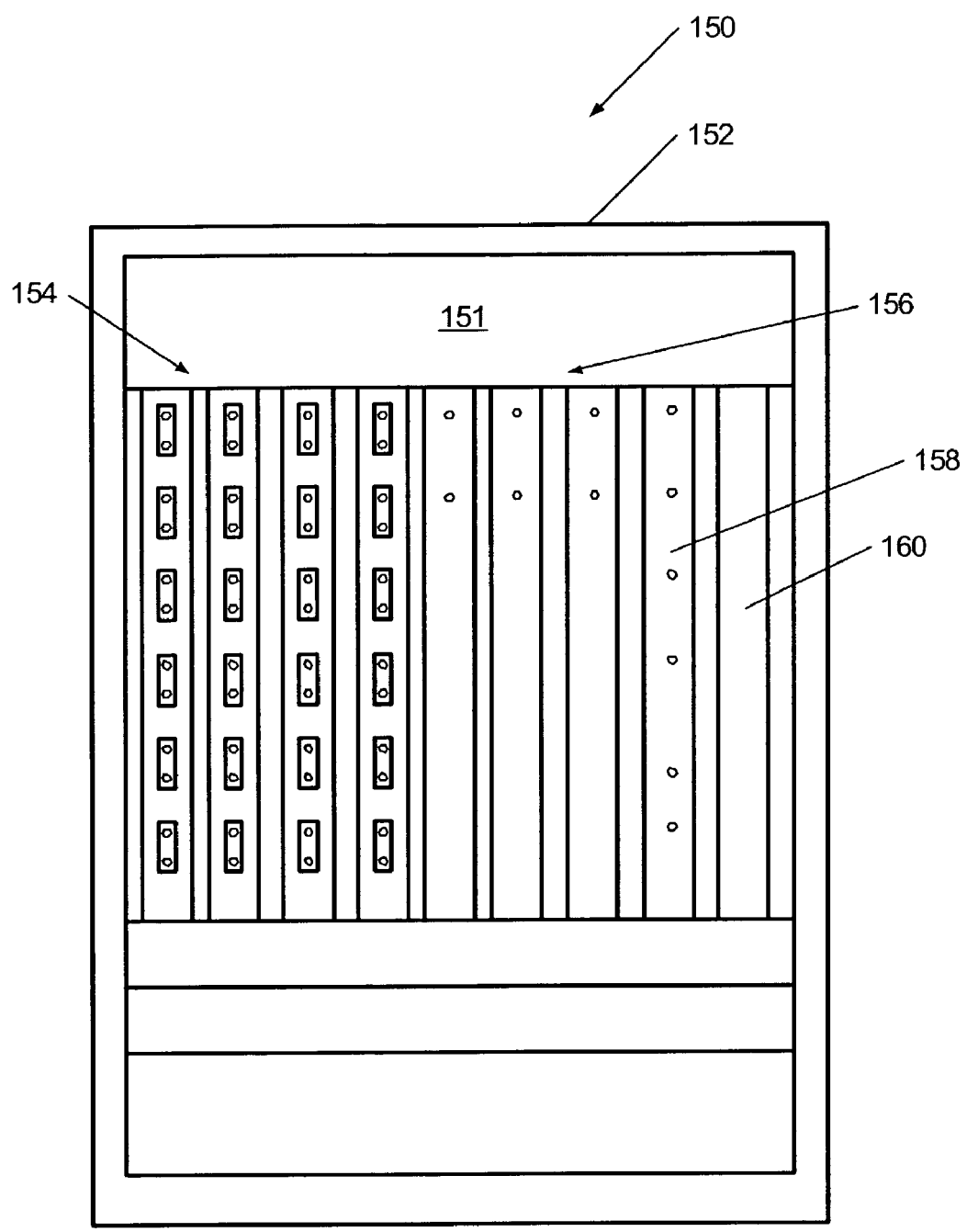
FIG. 9 is a schematic diagram illustrating an exemplary embodiment of a network router that integrates traffic analysis and intercept features with routing functionality.

FIG. 9 is a schematic diagram illustrating an exemplary embodiment of a network router 150 that integrates traffic analysis and intercept features with routing functionality. In the illustrated embodiment, network router 150 includes a chassis 152 for housing control unit 151 having a routing engine and a packet forwarding engine (not shown). In the illustrated example, chassis 150 has nine slots for receiving a set of cards. In particular, chasis 150 receives four interface cards (IFCs) 154, three accounting service cards 156, an encryption service card 158, and a tunnel service card 160. Each card may be inserted into a corresponding slot of chassis 152 for electrically coupling the card to control unit 151 via a bus, backplane, or other electrical communication mechanism. Interface cards 154 include ports for coupling to communication links.

Various embodiments of the invention have been described. These and other embodiments are within the scope of the following claims.

The invention claimed is:

1. An apparatus comprising:
a set of interface cards to receive packet flows from a network, wherein the packet flows include packets having at least a same source address and destination address;
a plurality of accounting service cards to calculate flow statistics for the packet flows, wherein each of the accounting service cards calculates flow statistics for a subset of the packet flows; and
a centralized control unit to receive the packet flows from the interface cards and distribute the packet flows across the plurality of accounting service cards such that packets of common packet flows are distributed to the same one of the plurality of accounting service cards, wherein the centralized control unit includes a forwarding engine that maintains forwarding information that associates the packet with next hops along routes through the network,
wherein each of the plurality of accounting service cards includes:
an interface to receive packets of the respective packet flows from the control unit, extract header information from each of the packets of the packet flows, and return the packets of the packet flows to the control unit; and
an accounting unit to receive the header information from the interface and generate the flow statistics for the respective packet flows based on the header information extracted from the packets of the packet flows, and
wherein the forwarding engine of the centralized control unit applies the forwarding information to the returned packets received from the accounting service cards to select outbound ports of the interface cards for forwarding the packets along the routes.

2. The apparatus of claim 1, further comprising a chassis having a plurality of slots to receive and couple the network interface cards and the plurality of accounting service cards to the control unit.

3. The apparatus of claim 1, wherein the control unit implements a hash function on the header information of the packets to calculate hash values that correspond to the packet flows, and distributes the packet flows across the plurality of accounting service cards based on the calculated hash values.

4. The apparatus of claim 3, wherein the header information comprises at least one of a source network address, a destination network address, a protocol, a source port number, a destination port number, and an ingress port number for the network interface card of the apparatus.

5. The apparatus of claim 1, wherein the control unit selects the header information to distribute packet fragments associated with a common one of the packet flows to the same one of the plurality of accounting service cards.

6. The apparatus of claim 1, wherein the accounting unit comprises a processor.

7. The apparatus of claim 1, wherein the interface includes a loop-back path to return the network packets to the control unit.

8. The apparatus of claim 1, wherein the interface receives packets carrying flow statistics from the accounting unit, and forwards the packets carrying flow statistics to the control unit along with the network packets of the packet flows.

9. The apparatus of claim 8, further comprising a tunneling service card that receives, via the control unit, the packets from each of the accounting service cards that carry the flow statistics for the respective packet flows associated with the accounting service cards, and aggregates flow statistics from the different accounting service cards, and returns the aggregated flow statistics to the control unit for forwarding.

10. The apparatus of claim 1, wherein the control unit comprises a routing engine to maintain routing information representing a topology of the network, and generate the forwarding information in accordance with the routing information.

11. The apparatus of claim 10, wherein the routing engine receives packets carrying flow statistics from the accounting cards and updates the forwarding information based on the flow statistics.

12. The apparatus of claim 1, further comprising:
an optical splitter coupled to a communication link within the network to passively collect the packets from the communication link,
wherein at least one of the interface cards includes a port for receiving the packets from the optical splitter.

13. The apparatus of claim 1, wherein the control unit mirrors the packets to produce a first stream of packets and a second stream of packets, and distributes the first stream of packets to the accounting service cards for calculation of the flow statistics, and applies a filter to the second stream of packets to intercept a subset of the packets.

14. The apparatus of claim 1, wherein at least one of the plurality of accounting service cards includes a timer, wherein the accounting unit outputs packets carrying the flow statistics in accordance with a configurable period maintained by the timer.

15. The apparatus of claim 1, wherein at least one of the plurality of accounting service cards includes a buffer to store the flow statistics, wherein the accounting unit maintains a timer to time inactivity of packet flows associated with the flow statistics, and outputs packets carrying the flow statistics upon expiration of the timer.

16. A method comprising:
 receiving packet flows from a network via a set of interface cards of a network device, wherein the packet flows include packets having at least a same source address and destination address;
 receiving, with a centralized control unit of the network device, the packet flows from the set of interface cards;
 distributing, with the centralized control unit of the network device, packets of the packet flows across a plurality of accounting service cards of the network device by distributing a subset of the packet flows to each of the plurality of accounting service cards and distributing packets of common packet flows to the same one of the plurality of accounting service cards within the network device;
 identifying, with an interface of the accounting service cards, header information and a payload for each of the packets;
 returning, with the interface of the accounting service cards, the packets from the accounting service cards to the control unit of the network device;
 forwarding, with the interface of the accounting service cards, the header information of the packets without the payload to accounting units of the accounting service cards; and
 calculating, with the accounting units of the accounting service cards, flow statistics for the packets based on the header information of the packets; and
 forwarding, with a forwarding engine of the centralized control unit, the returned packets received from the accounting service cards by applying forwarding information that associates the packets with next hops along routes through the network to select outbound ports of the interface cards for forwarding the packets along the routes.

17. The method of claim 16, further comprising:
 performing a hash function on header information of each packet to calculate a corresponding hash value that corresponds to the packet flow of the packet; and
 distributing the packets across the plurality of accounting service cards based on the calculated hash values.

18. The method of claim 17, wherein the header information comprises at least one of a source network address, a destination network address, a protocol, a source port number, a destination port number, and an ingress port number for the network interface card of the apparatus.

19. The method of claim 17, further comprising selecting the header information to distribute packet fragments associated with a common one of the packet flows to the same one of the plurality of accounting service cards.

20. The method of claim 17, further comprising:
 forwarding packets carrying the flow statistics from the accounting service cards to the control unit of the network device; and
 updating the routing information based on the flow statistics.

21. The method of claim 16, further comprising passively collecting the packets using an optical splitter coupled to a communication link within the network.

22. The method of claim 16, further comprising inserting the network interface cards and the accounting service cards into the network device via slots within a chassis of the network device to electrically couple the network interface cards and the accounting service cards to a control unit of the network device.

23. The method of claim 16, further comprising:
 forwarding packets carrying the flow statistics from the accounting service cards to the control unit of the network device;
 providing, with the control unit, the packets carrying the flow statistics from the accounting service cards to a tunneling service card within the network device;
 establishing, with the tunneling service, a network tunnel to a second network device;
 aggregating, with the tunnel service card, the flow statistics from the different accounting service cards to form an aggregated packet flow having aggregated flow statistics;
 processing the aggregated packet flow with the tunneling service card to form tunneled packets to carry the aggregated flow statistics; and
 returning, with the tunnel service card, the tunneled packets to the control unit for forwarding via the forwarding engine to the second network device over the network tunnel.

24. A network device comprising:
 a first interface means for receiving packet flows from a network, wherein the packet flows include packets having at least a same source address and destination address;
 a plurality of accounting means for calculating flow statistics for the packet flows, wherein each of the account means calculates flow statistics for a subset of the packet flows;
 centralized control means for distributing the packet flows across the plurality of accounting means such that packets of common packet flows are distributed to the same one of the plurality of accounting service cards;
 wherein each of the plurality of accounting means includes:
  a second interface means for receiving packets of the respective packet flows from the control means, extracting header information from each of the packets and returning the packets to the control means; and
  calculating means for calculating traffic flow statistics for the respective packet flows based on the header information extracted from the packets of the packet flows, and
 forwarding means, within the centralized control means, for forwarding the packets by applying forwarding information that associates the packets with next hops along routes through the network to select outbound ports of the first interface means for the returned packets received from the plurality of accounting means.

* * * * *

UNITED STATES PATENT AND TRADEMARK OFFICE
CERTIFICATE OF CORRECTION

| | |
|---|---|
| PATENT NO. | : 7,313,100 B1 |
| APPLICATION NO. | : 10/228150 |
| DATED | : December 25, 2007 |
| INVENTOR(S) | : Turner et al. |

It is certified that error appears in the above-identified patent and that said Letters Patent is hereby corrected as shown below:

Column 12, line 52 (Claim 10), "and generate the" should read -- and generates the --

Signed and Sealed this

Twenty-first Day of September, 2010

David J. Kappos
*Director of the United States Patent and Trademark Office*